(12) United States Patent
Alo et al.

(10) Patent No.: US 8,763,913 B2
(45) Date of Patent: Jul. 1, 2014

(54) RFID TAG INTEGRATED INTO AN ENCLOSURE SURFACE DOOR

(75) Inventors: Roland K. Alo, Raleigh, NC (US); Aaron R. Cox, Tucson, AZ (US); Joel A. Gotelaere, Rochester, MN (US); Max J. C. Koschmeder, Oronoco, MN (US); Kenneth E. Lubahn, Oronoco, MN (US); Michael J. MacPherson, Elgin, MN (US)

(73) Assignee: International Business Machines Corporation, Armonk, NY (US)

( * ) Notice: Subject to any disclaimer, the term of this patent is extended or adjusted under 35 U.S.C. 154(b) by 98 days.

(21) Appl. No.: 13/280,679

(22) Filed: Oct. 25, 2011

(65) Prior Publication Data

US 2013/0099004 A1 Apr. 25, 2013

(51) Int. Cl.
G06K 19/06 (2006.01)

(52) U.S. Cl.
USPC ............ 235/492; 340/572.1; 340/545.1; 235/487

(58) Field of Classification Search
USPC .......... 235/492, 487; 340/572.1, 572.8, 545.1
See application file for complete search history.

(56) References Cited

U.S. PATENT DOCUMENTS

| | | | |
|---|---|---|---|
| 5,078,296 A | 1/1992 | Amidzich | |
| 5,765,263 A | 6/1998 | Bolinas et al. | |
| 5,941,003 A | 8/1999 | Thalenfeld | |
| D470,893 S | 2/2003 | Valiulis et al. | |
| D485,582 S | 1/2004 | Valiulis | |
| D515,574 S | 2/2006 | Colburn | |
| 7,089,695 B2 | 8/2006 | Fast et al. | |
| 7,424,785 B2 | 9/2008 | Feroli et al. | |
| 7,533,800 B2 | 5/2009 | Tripp et al. | |
| 7,635,089 B2 | 12/2009 | Augustinowicz et al. | |
| 2005/0128085 A1* | 6/2005 | Bon | 340/572.7 |
| 2006/0187055 A1 | 8/2006 | Colby | |
| 2007/0007344 A1 | 1/2007 | Inoue et al. | |
| 2007/0080233 A1* | 4/2007 | Forster et al. | 235/492 |
| 2007/0171056 A1* | 7/2007 | Beyer | 340/545.2 |
| 2008/0007408 A1* | 1/2008 | Hwang et al. | 340/572.1 |

(Continued)

FOREIGN PATENT DOCUMENTS

JP 2009011716 A 1/2009

OTHER PUBLICATIONS

PCT/US2012/061288 International Search Report with Written Opinion. Jan. 9, 2013.

*Primary Examiner* — Steven S Paik
*Assistant Examiner* — Sonji Johnson
(74) *Attorney, Agent, or Firm* — Scott S. Dobson; Jennifer M. Anda (57) ABSTRACT

An RFID tag assembly for attachment to an enclosure surface including a door, an RFID tag attached to one face of the door or wrapped around the door, and an attachment device for connecting the door to the enclosure surface to allow the door to move to a position that shows both sides of the door. The RFID tag can include a ground plane, the tag wrapped around the door such that the ground plane is on the back of the door and the RFID tag antenna is on the front of the door. A ground plane can be provided on the enclosure inner or outer surface in alignment with the RFID tag antenna, with the antenna directly or inductively coupled to the ground plane when the door is in a closed position.

8 Claims, 10 Drawing Sheets

(56) References Cited

U.S. PATENT DOCUMENTS

| | | |
|---|---|---|
| 2008/0173713 A1 | 7/2008 | Higham |
| 2008/0230509 A1 | 9/2008 | Koo et al. |
| 2008/0303632 A1 | 12/2008 | Hammad |
| 2009/0044385 A1 | 2/2009 | Naderer et al. |

* cited by examiner

RFID TAG INTEGRATED INTO AN ENCLOSURE SURFACE DOOR

FIELD OF THE INVENTION

The present invention relates generally to the field of radio frequency identification ("RFID") tags, and more particularly to RFID tags attached to electronic and other enclosures.

BACKGROUND

Radio frequency identification is a technology by which electromagnetic waves are transmitted from a reader device to an RFID tag. When the tag is in the interrogation zone of the reader, identifying information of the object is transmitted by the tag to the reader. The RFID tag is attached to or enclosed within an object or container and can be read by the reader without the object being contacted.

An RFID tag typically includes an IC chip with control logic, and an antenna for radio communication. Active tags refer to those that have an internal power source; passive tags refer to those that don't have an internal power source. Active tags can transmit radio frequency information whether or not they are within the interrogation zone of an RFID reader. Passive tags are inductively powered by the radio frequency waves received from the RFID reader, and transmit, or "reflect," a modulated signal containing identification information. Active tags are able to transmit much more information than passive tags. However, even passive tags are able to transmit on the order of several kilobits of information.

RFID technology is well known and is in widespread use in many different industries, including the shipping industry to track packages, the retail industry for theft control and inventory tracking, and the veterinary field for "microchipping" animals, such as cats, dogs, and livestock. Many retailers require that RFID tags be affixed to product delivered from their suppliers to help with the burdensome and repetitive tasks associated with inventory control. With the use of hand held and automated RFID scanners, retailers are cutting the time and man power required to perform these tasks to a fraction of the effort that is currently required with bar code readers and manual recording of inventory. However, many products, particularly in the high-tech component industries, are already tightly packed with functional items such as openings needed for airflow, externally accessible components (such as fans and hard drives), operator panels and branding. In many cases, affixing an additional functional element to the enclosure would prove difficult.

The form factors of RFID tags vary greatly. The tag can range from the size of a pin head to several square inches. Although factors such as power and durability influence form factor, a major factor is antenna size. Antenna size is primarily determined by the frequency range in which the tag operates. Low frequency (LF) tags operate at about 125 kHz and typically have a small ferrite-coil antenna. A typical form factor for LF RFID tags is a key fob, such as those used at certain gas stations to activate a gas pump. High frequency (HF) RFID tags operate at 13.56 MHz. The typical antennas on these tags consists of several flat windings inlayed on label stock forming a circle, square, or rectangle on the order of one to two inches square. Ultra-high frequency (UHF) RFID tags operate in a range between 860-940 MHz. The typical antennas on these tags consist of an antenna inlaid on label stock, with an overall dimension from about a half-inch square to one inch by three inch rectangle.

The radiation performance of certain antennas used in RFID tags, such as several configurations used with HF and UHF RFID tags, can be enhanced by placing the antenna very close to a flat conducting thin metal plate. The thin metal plate, referred to as a ground plane, can have dimensions approximately equal to the antenna, and can be fabricated as part of the tag. The ground plane, made of a thin metallic layer, is separated from the antenna by a dielectric material.

A type of RFID tag referred to as a "smart label" incorporates an RFID tag into a traditional label. A smart label typically has human readable text and graphics and/or bar code information printed on label stock that incorporates RFID technology. This allows the smart label information to be read by a variety of technologies, including RFID readers, bar code readers, and simple human sight.

SUMMARY

A radio frequency identification (RFID) tag assembly for attachment to an enclosure surface comprising a door, an RFID tag attached to one face of the door or wrapped around the door to attach to both faces of the door, and an attachment device for connecting the door to the enclosure surface to allow the door to move to a position that shows both sides of the door for viewing. Both sides of the door and the enclosure surface covered by the door when in a closed position are available for the display of graphics, symbols, and text.

In certain embodiments of the invention, the RFID tag includes a ground plane, the tag wrapped around the door such that the ground plane is on the back of the door and the RFID tag antenna is on the front of the door. In other embodiments, a ground plane is provided on the enclosure inner or outer surface in alignment with the RFID tag antenna, and the antenna is coupled to the ground plane when the door is in a closed position by direct electrical contact or by inductive connection across an air gap.

DETAILED DESCRIPTION

In general, the embodiments describe a radio frequency identification (RFID) tag formed as a door structure that when "closed" lays flat against or within a recess pre-formed on a bezel or other surface of an enclosure. The RFID tag is of the "smart label" type and can have text and symbols on the outward face and the inside of the door. In addition, the enclosure surface covered by the door when in the closed position is also available for text and symbols. In this manner, a surface area that was previously used, for example, for a model type and serial number (M/T+S/N) label might now be used to display three times as much information by virtue of the door structure. The smart label that wraps around the door and is printed with text and symbol information doubles as an RFID tag that can be used for inventory and other purposes. These embodiments present an advantage over traditional M/T+S/N labels when accessible bezel or enclosure surface space is at a premium. The smart label door structure can be very compact when compared to the enclosure or bezel surface area that would be required for separate labels and RFID tags.

Embodiments of the present invention will now be described in detail with reference to the accompanying drawings.

Figure 1:
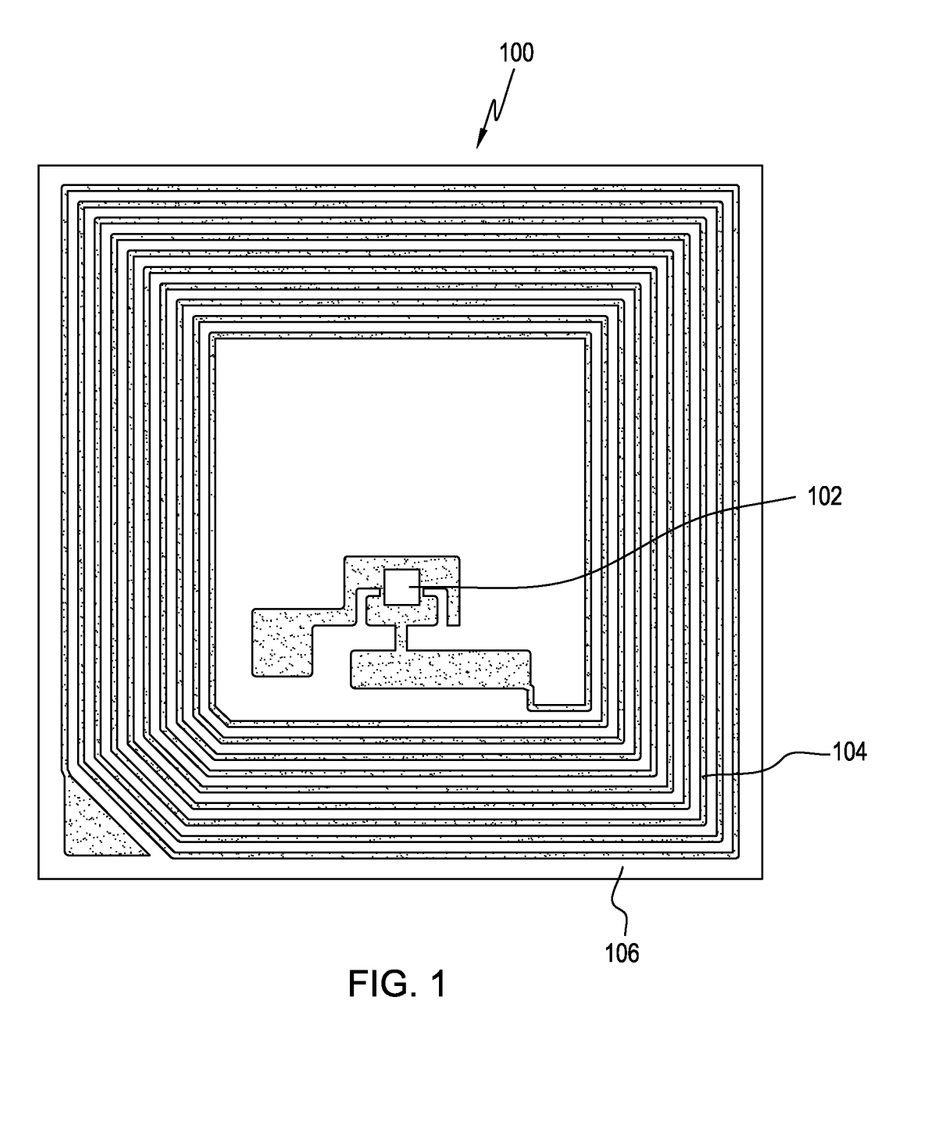
FIG. 1 is a plan view of an example of a high frequency RFID tag.

FIG. 1 is a plan view of an example of a high frequency RFID tag. RFID tag 100 includes integrated circuit (IC) chip 102 and antenna 104, both inlayed on a dielectric backing 106. IC chip 102 contains control logic to wake the circuit when it detects a sufficient induced voltage in antenna 104 caused by impinging radio frequency electromagnetic waves from, for example, an RFID reader (not shown). IC chip 102 then modulates the induced voltage in antenna 104 in accordance with data and logic stored on the chip as a means for transmitting information to the RFID reader. Dielectric backing 106 can be, for example, flexible label stock, a credit card or other smart card, an identification badge, etc.

Figure 2A:
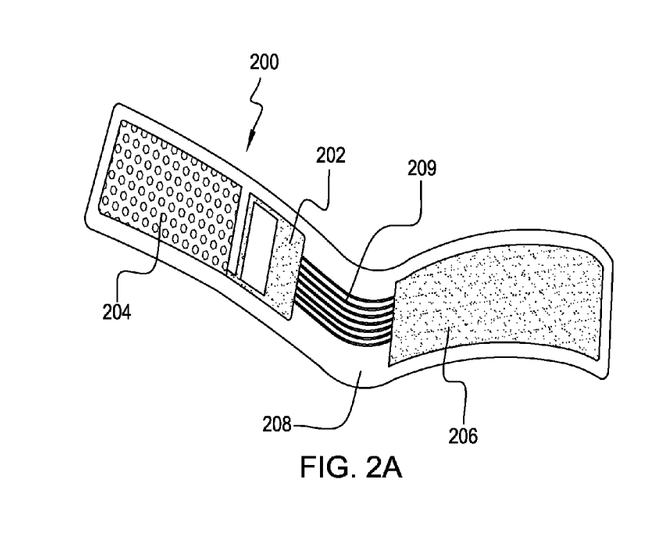
FIGS. 2a, 2b, and 2c are perspective views of a prior art ultra-high frequency RFID tag that incorporates a ground plane.
Figure 2B:
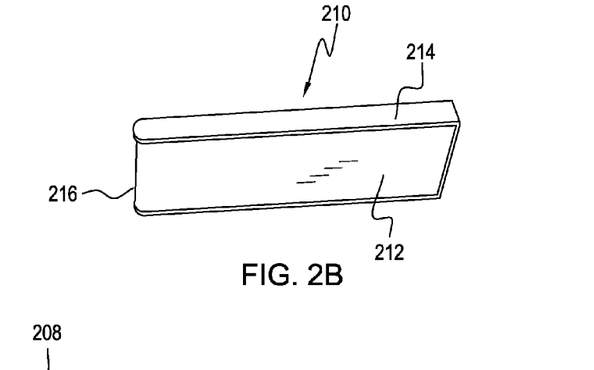
Figure 2C:
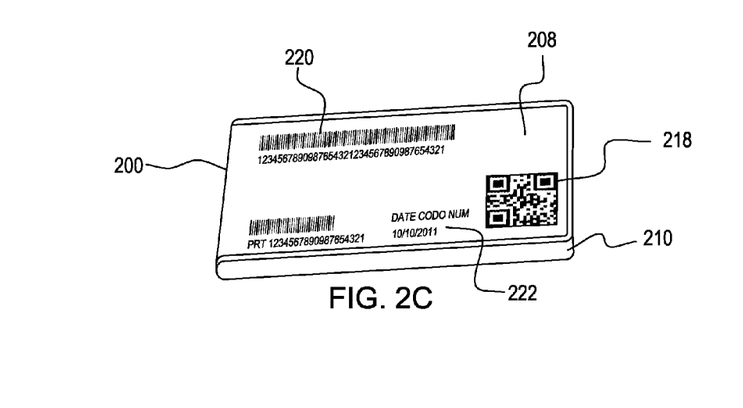

FIGS. 2a, 2b, and 2c are perspective views of a prior art ultra-high frequency RFID smart label that incorporates a ground plane. As shown in FIG. 2a, RFID tag 200 includes integrated circuit 202, antenna 204, and ground plane 206, all inlayed on a dielectric backing 208 and all in electrical communication via inlayed traces 209. In this example, dielectric backing material 208 is thin flexible label stock. Integrated circuit 202 and antenna 204 operate in the manner described above in relation to FIG. 1. When ground plane 206 is in close parallel proximity to antenna 204, it acts to improve the radiation performance of antenna 204.

A typical method to fix ground plane 206 in close parallel proximity to antenna 204 is to fold RFID tag 200 around a thin piece of dielectric material, typically a piece of dielectric plastic, as shown, for example, by dielectric spacer 210 in FIG. 2b. When RFID tag 200 is folded around dielectric spacer 210, ground plane 206 and antenna 204 should be in parallel opposing alignment. Dielectric spacer 210 consists of top face 212 and its opposing bottom face, not shown; and lateral face 214 and adjacent lateral face 216, with their opposing respective lateral faces not shown. In this example, lateral face 216 is curved to accept the "U" of the fold when RFID tag 200 is folded around dielectric spacer 210. Top face 212 and its opposing bottom face are dimensioned to fully accept the antenna end and the ground plane end of RFID tag 200, respectively, with no tag overhang when folded around dielectric spacer 210.

FIG. 2c shows an example of a prior art assembled RFID smart label consisting of RFID tag 200 folded around dielectric spacer 210. In this example, RFID tag 200 has been folded around dielectric spacer 210 such that the inlayed IC chip 202, antenna 204, and ground plane 206 are directly adjacent to and in close contact with dielectric spacer 210. For example, RFID tag is held against dielectric spacer 210 with a non-electrically interfering adhesive. As can be seen in FIG. 2c, label stock 208 has been printed on its outward face with graphics, in this case a 2D barcode code 218, a Universal Product Code 220, and text 222.

Figure 3:
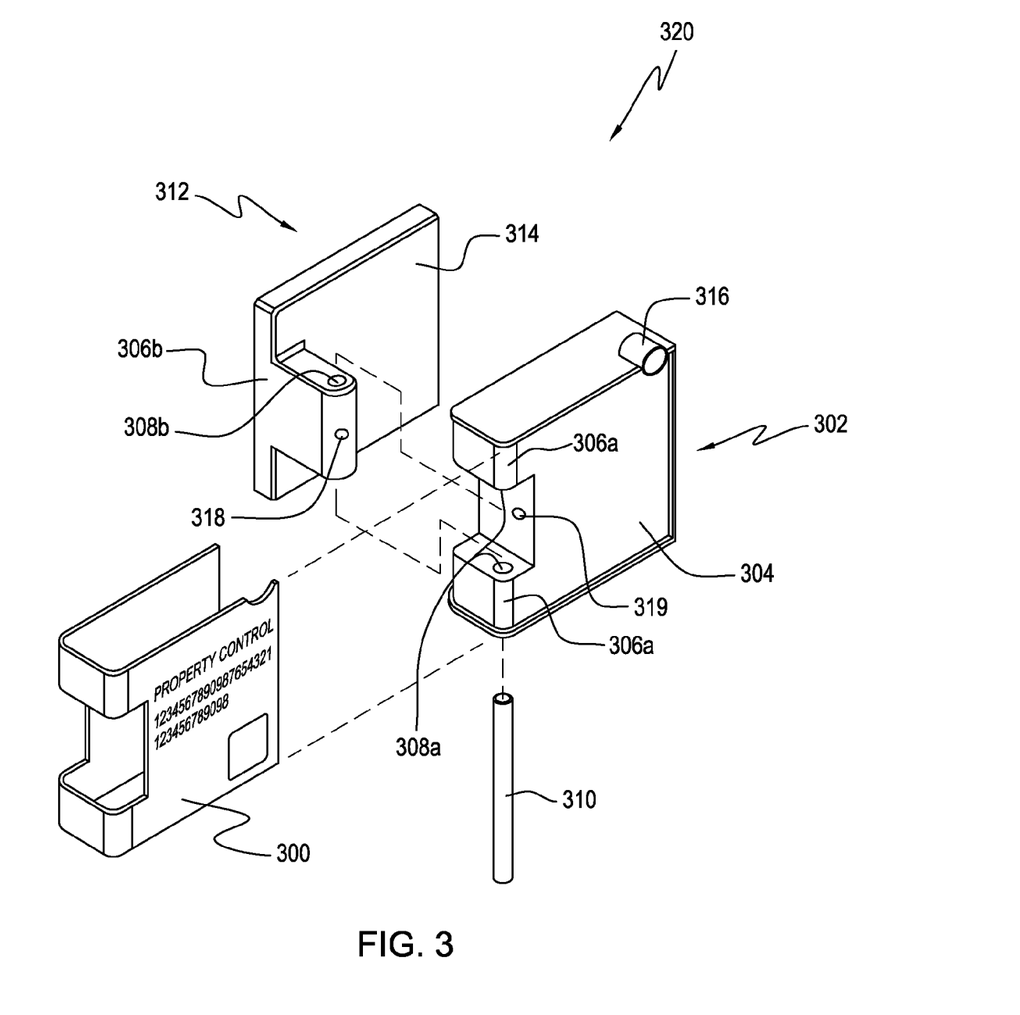
FIG. 3 is an exploded view of an embodiment of the present invention.

FIG. 3 is an exploded view of an embodiment of the present invention. The embodiment includes an RFID tag 300, a dielectric or plastic "door" 302, and a hinge base piece 312. Hinge knuckles 306a and 306b and hinge pin 310 form a three-knuckle butt hinge. When assembled, RFID tag 300 is disposed about door 302 and held in place by, for example, an adhesive on door face 304 and its opposing door face, not shown. In this embodiment, RFID tag 300 can include a ground plane, such as illustrated in relation to RFID tag 200 in FIG. 2a, or RFID tag 300 can be of the type shown in FIG. 1 that doesn't include a ground plane. Door 302 includes a finger catch detail 316 to aid in opening door 302 when it is in the closed position. A bump 318 and detent 319 are located on single hinge knuckle 306b and door 302 such that when the door is rotated about hinge pin 310 into an "open" position, bump 318 engages detent 319. This engagement can serve to indicate the position of door 302 about hinge pin 310 or to hold door 302 in position. In a preferred embodiment, the materials that comprise hinge base piece 312 and door 302 are sufficiently resilient and/or there is sufficient play between the pieces of RFID tag door assembly 320 that the engagement between bump 318 and detent 319 is temporary and can be easily broken by rotating door 302 to either side of the engagement position. Single hinge knuckle 306b is positioned between double hinge knuckles 306a such that hinge pin holes 308a and 308b are axially aligned. Hinge pin 310 is inserted in hinge pin holes 308a and 308b to secure door 302 to hinge base piece 312. In this embodiment, the visible face of RFID tag 300, which faces outward when in assembled position on the front face 304 of door 302, as well as the opposing outward face on the back side of door 302, not shown, are available for the display of text and graphics. In addition, face 314 on hinge base piece 312 is also available for the display of text and graphics. The full RFID tag door assembly 320 is secured to a bezel or enclosure by, for example, adhesive on the face opposite face 314 of hinge base piece 312. In an alternative embodiment, hinge base piece 312 is made of a transparent or translucent material such as, for example, an acrylic plastic, such that hinge base piece 312 can be adhesively secured over an M/T+S/N label that is attached to an enclosure surface and the M/T+S/N label can be read by an individual or machine through face 314 of hinge base piece 312.

Figure 4A:
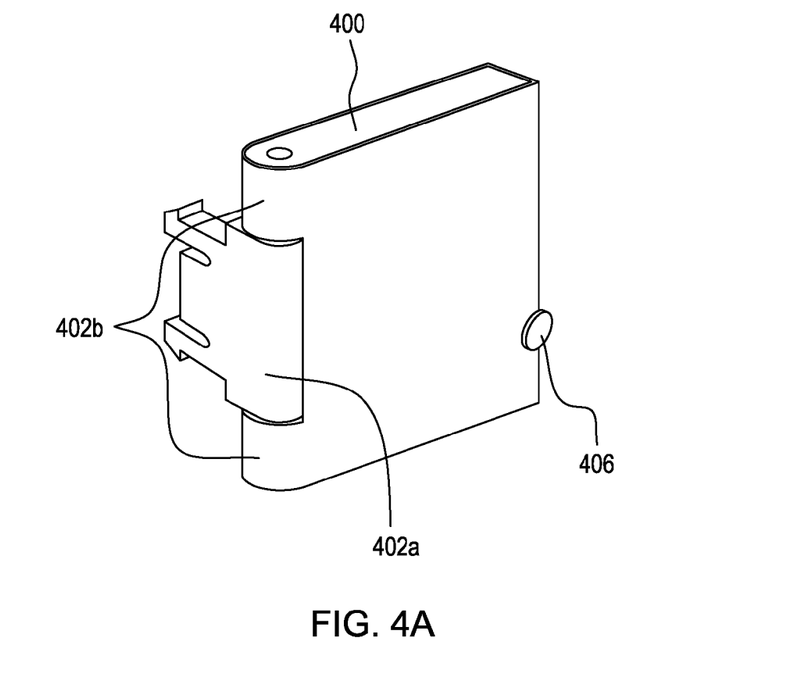
FIGS. 4a and 4b show a perspective view of an alternative embodiment of the present invention.
Figure 4B:
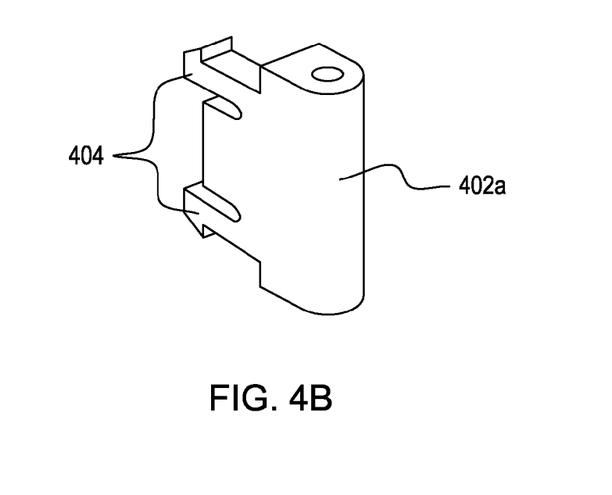

FIGS. 4a and 4b illustrate a perspective view of an alternative embodiment of the present invention, in which an alternate method of attaching an assembled door 400 to a bezel or enclosure is shown. Single hinge knuckle 402a and double hinge knuckles 402b, along with a hinge pin, not shown, form a three-knuckle butt hinge for door 400. In this embodiment, the hinge and door assembly is secured to a bezel or enclosure by flexible snap lock pieces 404 that are inserted into corresponding openings on the bezel or enclosure (not shown). Door 400 includes a finger catch detail 406 to aid in opening door 400 when it is in the closed position. Similar to the embodiment shown with respect to FIG. 3, an RFID tag would be folded around door 400, with the outward facing portions of the tag on the outer and inner faces of the door available for the display of text and graphics. When the tag and door assembly is attached to a bezel or enclosure, the space on the bezel or enclosure covered by the door when it is in the closed position would also be available for the display of text and graphics.

While this embodiment shows the door and hinge assembly attached to the bezel or enclosure with flexible snap lock pieces, other attachment methods can be used. For example the single hinge knuckle 402a could incorporate different styles of plastic snap lock pieces, crush pins, heat stake pins, screw points, rear clips, etc. Alternatively, single hinge knuckle 402a could be a detail that is molded into the bezel or enclosure surface.

Figure 5A:
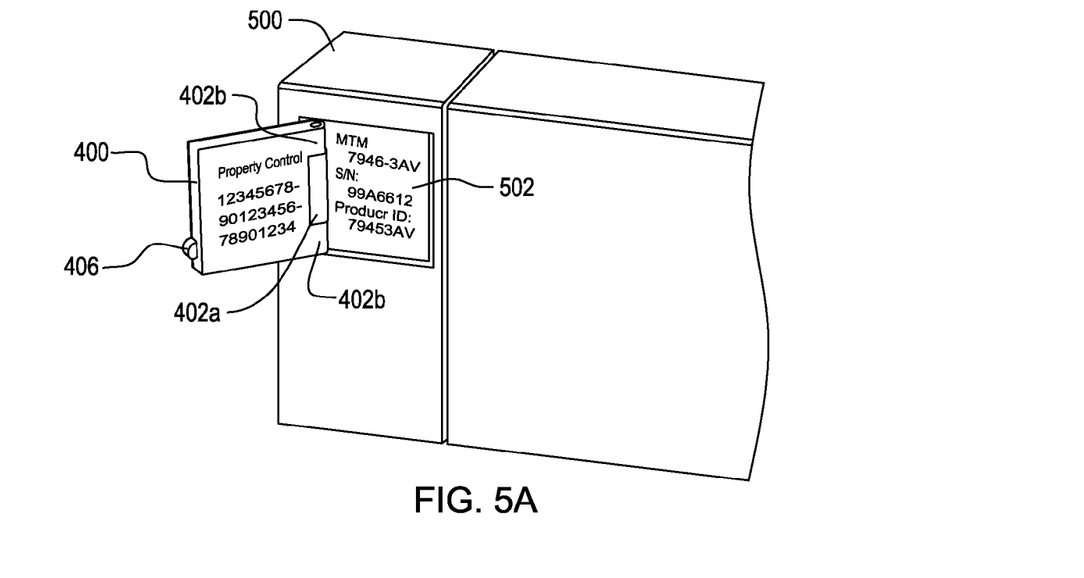
FIGS. 5a and 5b are perspective views of an embodiment of the present invention.
Figure 5B:
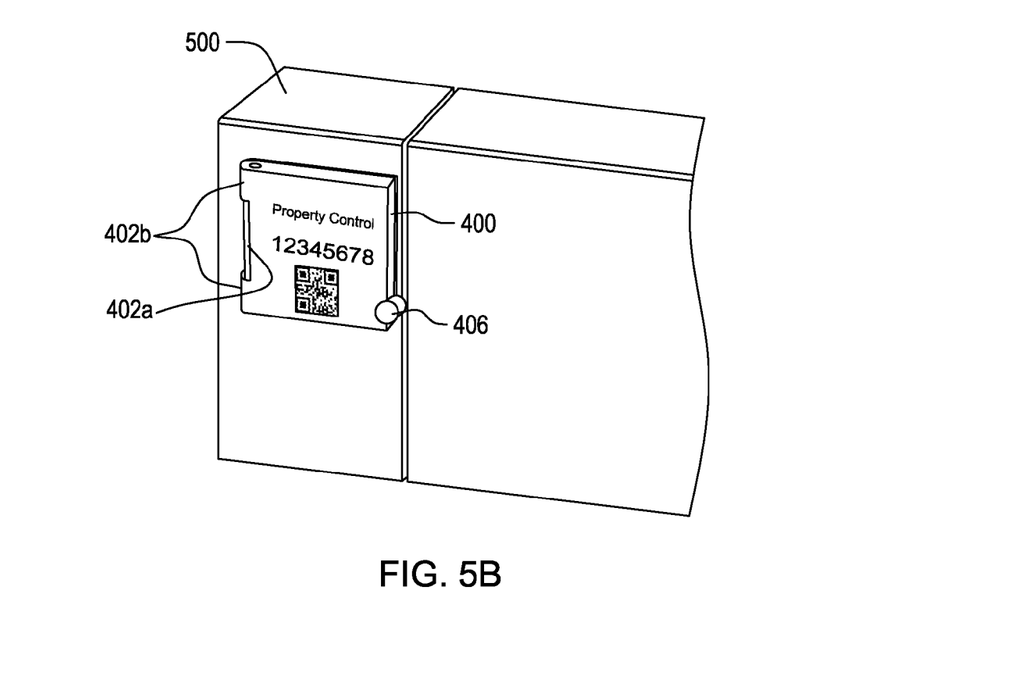

FIGS. 5a and 5b show perspective views of RFID tag assembly door 400 installed on an enclosure 500. FIG. 5a shows door 400 in an open position. As can be seen, the inside of door 400 as well as the enclosure surface 502 that is covered by door 400 when in the closed position are available to display text and graphics. FIG. 5b shows door 400 in a closed position. As can be seen, the outward surface of door 400 is available to display text and graphics.

Figure 6A:
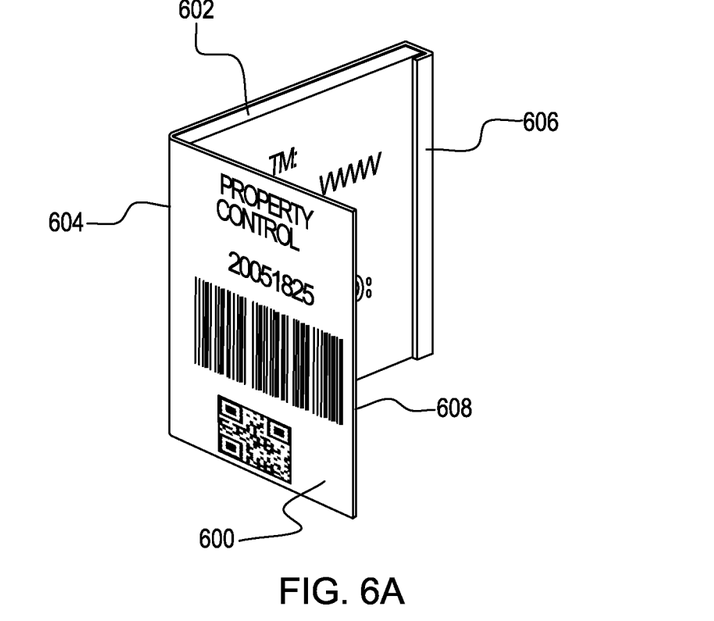
FIGS. 6a, 6b, and 6c are perspective views of a second alternative embodiment of the present invention with variations.
Figure 6B:
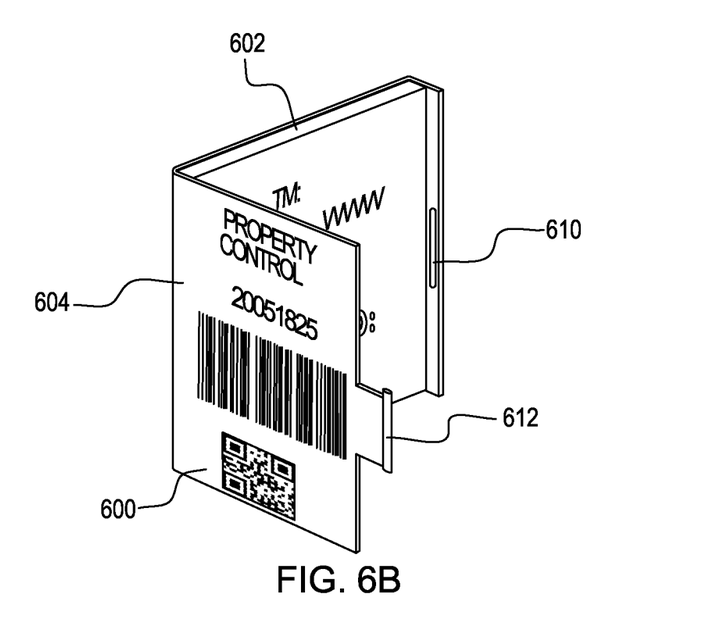
Figure 6C:
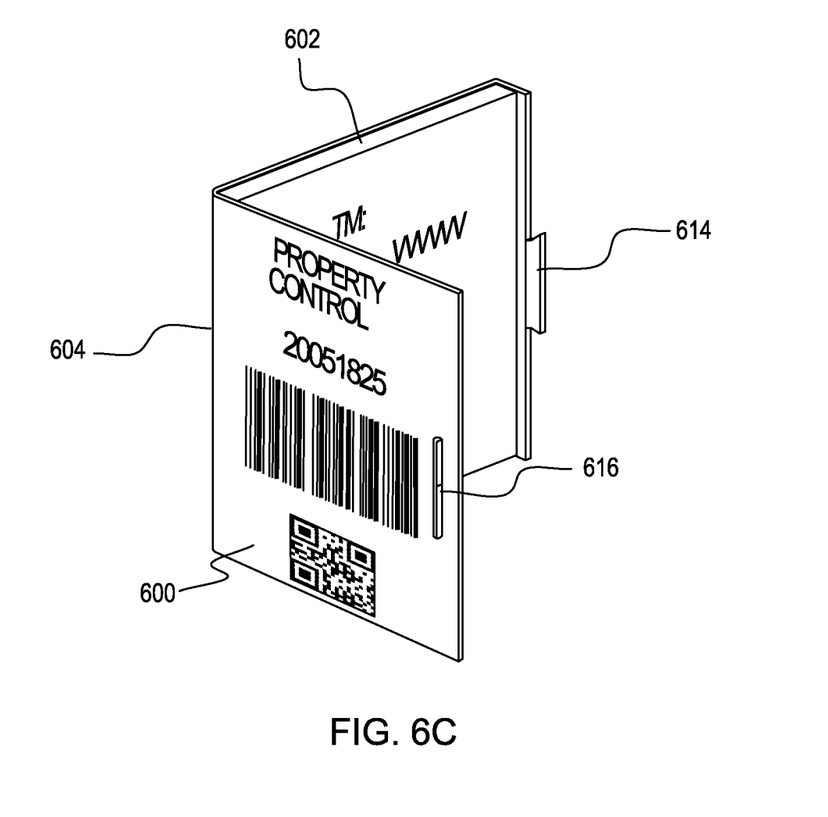

FIGS. 6a, 6b, and 6c are perspective views of alternative embodiments of the present invention. FIG. 6a shows a plastic piece 602 dimensioned such that RFID tag 600 folds around plastic piece 602 and covers the front and rear faces of plastic piece 602 with no overhang of RFID tag 600 at least on the top and bottom lateral faces of plastic piece 602. In this embodiment, RFID tag 600 is adhesively attached to plastic piece 602 only on the back face of plastic piece 602, and the unattached portion of RFID tag 600 forms a "door" that folds onto the front face of plastic piece 602 when the door is in a closed position. Door hinge 604 is integrated into the RFID tag 600 backing material as a living hinge. The door portion of RFID tag 600 is held in a closed position by slipping the free edge 608 of the door under a small securing flap 606. Securing flap 606 can be, for example, a leading edge of the RFID tag 600 backing material wrapped around the lateral edge of plastic piece 602 opposite the door hinge lateral face. Alternatively, securing flap 606 can be, for example, a separate piece that is attached to plastic piece 602, or a detail that is molded as part of plastic piece 602. In this embodiment, flap 606 and/or the door portion of RFID tag 600 are sufficiently flexible to allow the leading edge of the RFID tag 600 to be slipped under and removed from securing flap 606 as desired. In this embodiment, the RFID tag assembly is secured to a bezel or enclosure by adhesive placed on the outward facing portion of RFID tag 600 that is opposite the portion of the tag that is secured to the back face of plastic piece 602. As is shown, the outward and inner surfaces of the "door" portion of RFID tag 600, as well as the portion of plastic piece 602 that is covered by the door when in a closed position are available for the display of graphics, symbols and text.

FIGS. 6b and 6c are variations on the embodiment illustrated in FIG. 6a, showing different methods to secure the door portion of RFID tag 600 in a closed position. In FIG. 6b, the door portion of RFID tag 600 is secured in a closed position by a slot and tab arrangement, as illustrated by tab 612, which is fitted through slot 610, and acts to secure the door portion of RFID tag 600 in a closed position. Similarly, the embodiment illustrated in FIG. 6c uses a slot and tab arrangement consisting of slot 616 and tab 614. In both these embodiments, tabs 612 and 614 have small lateral wing pieces that are dimensioned to extend slightly beyond the ends of slots 610 and 616, respectively, and help secure the tabs in their respective slots. In these embodiments, the tabs are sufficiently flexible so as to allow them to inserted and removed from their respective slots as desired. In these embodiments, the RFID tag assemblies are secured to a bezel or enclosure by adhesive placed on the outward facing portion of RFID tag 600 that is opposite the portion of the tag that is secured to the back face of plastic piece 602. As is shown, the outward and inner surfaces of the "door" portions of RFID tag 600, as well as the portion of plastic piece 602 that is covered by the door when in a closed position are available for the display of graphics, symbols, and text.

Figure 7:
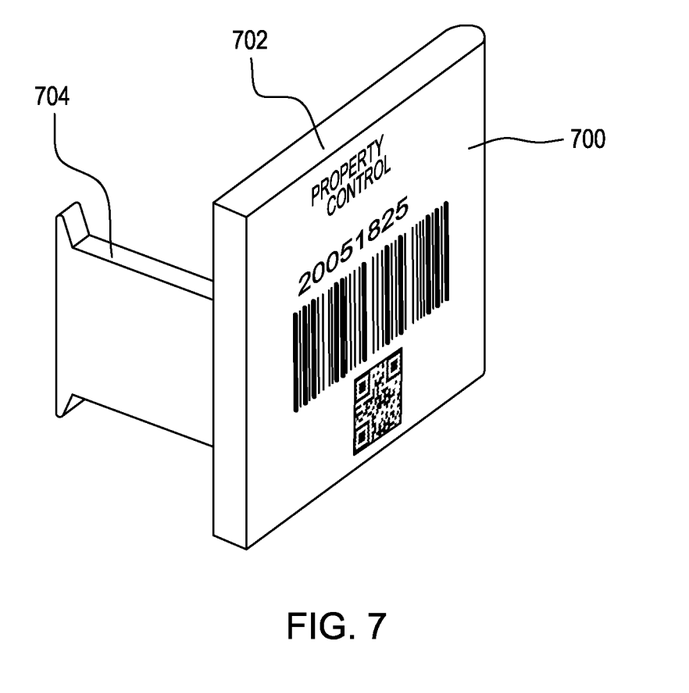
FIG. 7 is a perspective view of a third embodiment of the present invention.

FIG. 7 shows a perspective view of another alternative embodiment of the present invention. In this embodiment, RFID tag 700 is attached to a rubberized backing piece 702. A securing tab 704 is attached to the back of rubberized backing piece 702. In practice, a recess on a bezel or enclosure (not shown) would accept the RFID tag assembly in a slight compression fit such that the outward face of RFID tag 700, shown in FIG. 7 as the visible face of RFID tag 700 with text and graphics printed thereon, is almost flush with the bezel or enclosure surface. The compression fit is such to allow the tag assembly to be easily removed and returned to the recess, and the assembly to remain within the recess during normal handling of the enclosure. Securing tab 704 would fit through a slot disposed within the recess and aligned with tab 704 so as to loosely secure the tag to the enclosure when the tag assembly is out of the recess.

Figure 8A:
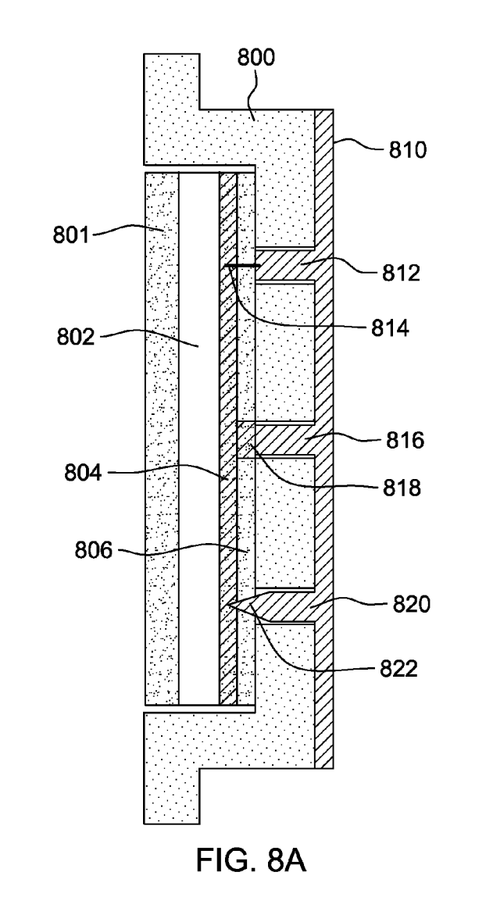
FIGS. 8a and 8b are sectional views of a fourth alternative embodiment of the present invention that incorporates a ground plane.
Figure 8B:
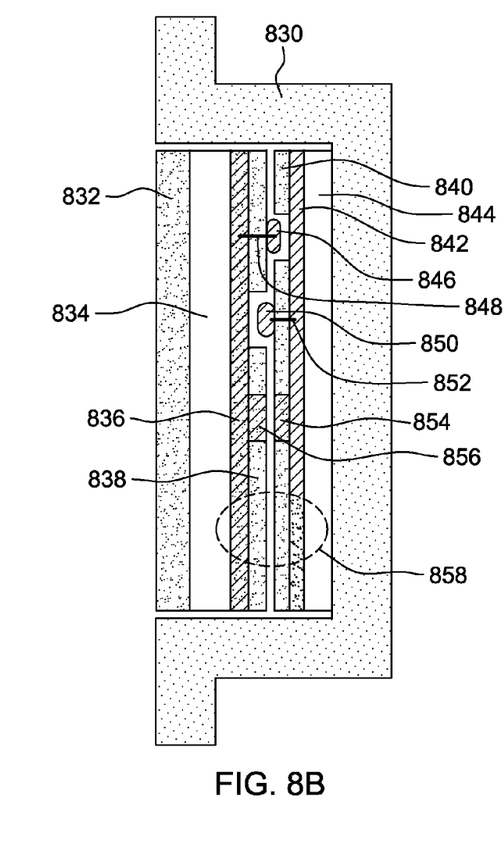

FIGS. 8a and 8b are composite sectional views through an RFID tag door assembly showing additional embodiments of the present invention that incorporate ground planes, including several alternative methods of electrically connecting the ground plane to the RFID circuit. As stated above with respect to FIG. 2a, a ground plane in close parallel proximity to an antenna can improve the radiation performance of the antenna. FIG. 8a shows an embodiment of the invention having an RFID door assembly disposed within a recess of an enclosure or bezel, with a ground plane positioned within the interior of the enclosure or bezel and in substantial alignment with the recess. The RFID door assembly, for example an assembly similar in construction to the embodiment of FIG. 4a, consists of outer backing material 801, plastic piece 802, RFID components 804, and inner backing material 806. In this embodiment, RFID components 804 would include an antenna, such as one similar to antenna 104 as displayed in FIG. 1. The RFID door assembly, when in a closed position as shown, is disposed within a recess formed as part of a bezel or enclosure 800. A ground plane 810 is disposed within the interior of enclosure 800 and substantially covers the interior back wall of the recess. A composite of three different methods of directly electrically connecting ground plane 810 to RFID components 804 are illustrated, although in practice only one connection would typically be used.

In a first direct connection method, a connection post 812 is integral to ground plane 810 and extends through an opening in the back enclosure wall of the recess. Connection post 812 is topped with a conductive spike 814 which pierces inner backing material 806 to make direct electrical contact at an appropriate point of RFID components 804 when the RFID door assembly is in a closed position.

In a second direct connection method, RFID components 804 includes an exposed trace portion 818 accessible through an opening in inner backing material 806. A conductive post 816 integral to ground plane 810 makes direct electrical contact with exposed trace portion 818 when the RFID door assembly is in a closed position.

In a third direct connection method, a connection post 820 is integral to ground plane 810 and is shaped so as to come to a point 822 at its distal end. The connection post point 822 extends through inner backing material 806 to make direct electrical contact at an appropriate point of RFID components 804 when the RFID door assembly is in a closed position.

FIG. 8b shows an embodiment of the invention having an RFID door assembly disposed within a recess of an enclosure or bezel, with a ground plane positioned within the recess. The RFID door assembly, for example an assembly similar in construction to the embodiment of FIG. 4a, consists of outer backing material 832, plastic piece 834, RFID components 836, and inner backing material 838. In this embodiment, RFID components 836 would include an antenna, such as one similar to antenna 104 as displayed in FIG. 1. The RFID door assembly, when in a closed position as shown, is disposed within a recess formed as part of a bezel or enclosure 830. A ground plane 842 is disposed between a ground plane plastic backing piece 844 and a ground plane backing material 840. Ground plane plastic backing piece 844 is secured to the back face of the recess. A composite of three different methods of inductively connecting ground plane 842 to RFID components 836 are illustrated, although in practice only one connection would typically be used.

In a first inductive connection method, a conductive bead 846 is attached to a conductive spike 848, which pierces inner backing material 838 and makes direct electrical contact at an appropriate point of RFID components 836. When the RFID door assembly is in a closed position, conductive bead 846 is disposed within an opening in ground plane backing material 840 that exposes a portion of ground plane 842 such that there is an air gap between conductive bead 846 and the exposed portion of ground plane 842. In this manner, an inductive electrical connection between RFID components 836 and ground plane 842 can be established via conductive bead 846 and conductive spike 848.

In a second inductive connection method similar to the method just described, a conductive bead 850 is attached to a conductive spike 852, which pierces ground plane backing material 840 and makes direct electrical contact to ground plane 842. When the RFID door assembly is in a closed position, conductive bead 850 is disposed within an opening in inner backing material 838 that exposes an appropriate portion of RFID components 836 such that there is an air gap between conductive bead 850 and the exposed portion of RFID components 836.

In a third inductive connection method, an inductive connection is established between RFID components 836 and back plane 842 via an exposed trace portion 856 of RFID components 836 that is aligned with an exposed trace portion 854 of backplane 842. When the RFID door assembly is in a closed position, exposed trace portions 854 and 856 are aligned such that there is an air gap between them, and an inductive connection can be established across this air gap.

In a fourth inductive connection method, an inductive connection is established between RFID components 836 and back plane 842 through simple proximity of ground plane 842 and RFID components 836. An exemplary portion 858 of the RFID door structure and back plane structure indicates a portion where such an inductive connection might occur.

Although specific implementations by which an RFID component antenna might be electrically connected to a ground plane are illustrated in FIGS. 8a and 8b, other connection methods can be used. In general, any direct or inductive connection method can be used that allows the RFID tag door assembly to operate as intended, and results in enhancement of the radiation properties of the RFID antenna.

Figure 9A:
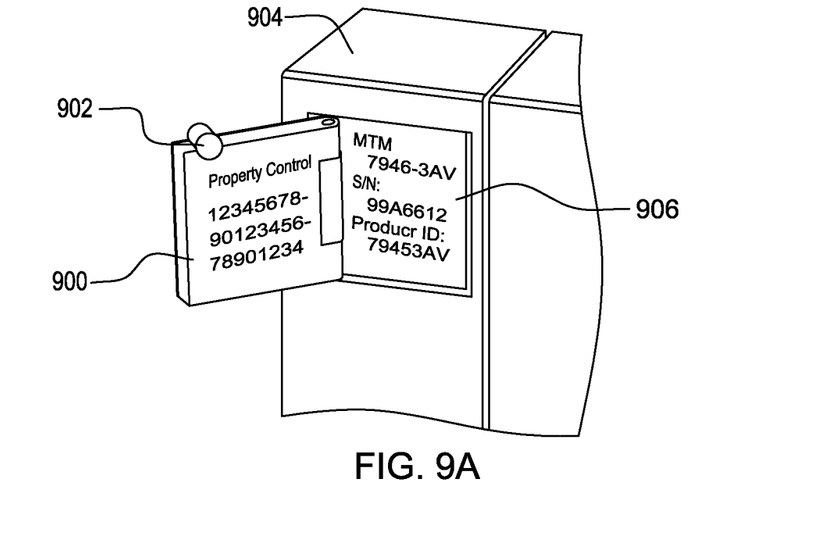
FIGS. 9a and 9b are perspective views of the fourth alternative embodiment of the present invention.
Figure 9B:
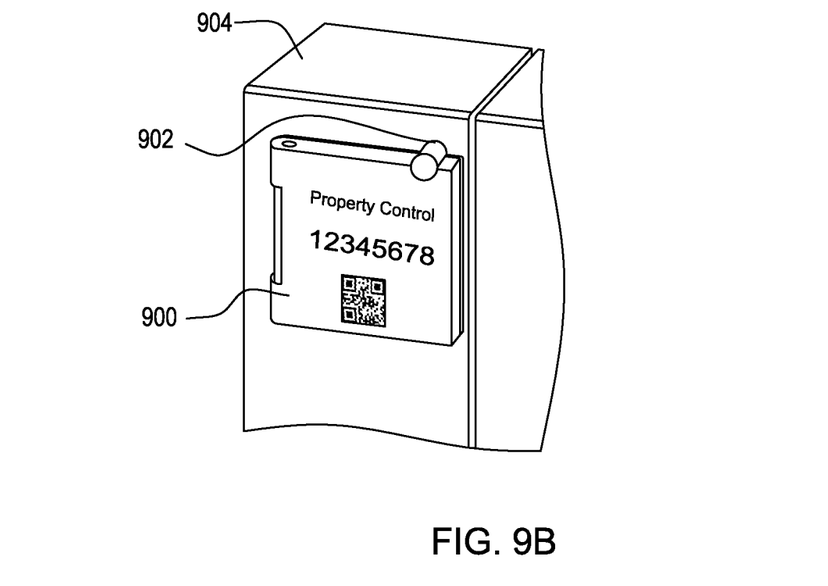

FIGS. 9a and 9b show perspective views of an RFID tag door assembly 900, such as those illustrated in FIGS. 8a and 8b, attached to a bezel or enclosure 904. As in the embodiments illustrated in FIGS. 8a and 8b, enclosure 904 includes a ground plane (not shown) disposed in opposing alignment to RFID door assembly 900, either within the interior of enclosure 904, or on the exterior of enclosure 904, for example behind identification tag 906. RFID door assembly 900 includes a metal contact 902 that is in electrical connection with an appropriate portion of the RFID components (not shown) within RFID tag door assembly 900. When door 900 is in a closed position, as illustrated in FIG. 9b, metal contact 902 operates to form an electrical connection between the RFID components within RFID tag door assembly 900 and the ground plane of enclosure 904. The electrical connection could operate, for example, in the manner of trace portion 818 and conducting post 816, conducting bead 846 and ground plane 842, or trace portions 854 and 856, all as illustrated in FIG. 8b. As can be seen, the inner and outer faces of RFID door assembly 900 as well as the enclosure surface behind identification tag 906 that is covered by door 900 when in the closed position are available to display text and graphics.

The foregoing description of various embodiments of the present invention has been presented for purposes of illustration and description. It is not intended to be exhaustive or to limit the invention to the precise form disclosed. Many modifications and variations are possible. Such modifications and variations that may be apparent to a person skilled in the art of the invention are intended to be included within the scope of the invention as defined by the accompanying claims.

What is claimed is:

1. A radio frequency identification (RFID) tag assembly for attachment to an enclosure surface, the RFID tag assembly comprising:
    a door having an inner face and an opposing outer face wherein when the door is in a closed position, the inner face is adjacent to the enclosure surface;
    an RFID tag having an antenna, disposed on one or both of the inner face and outer face of the door, wherein the door does not substantially interfere with the radiation performance of the antenna; and
    a hinge for connecting the door to the enclosure surface to allow the door to move to a position that exposes the inner face and the outer face or items attached thereto for viewing, wherein the hinge comprises:
    one or more hinge knuckles attached to the enclosure surface;
    one or more hinge knuckles attached to the door, the door hinge knuckles interleaved with the enclosure surface hinge knuckles; and
    a hinge pin disposed axially through all hinge knuckles so as to secure all hinge knuckles in an axially rotational operational arrangement, wherein the one or more enclosure surface hinge knuckles further comprise resilient snap lock pieces that engage corresponding one or more openings on the enclosure surface thereby securing the enclosure surface hinge knuckles to the enclosure surface.

2. The RFID tag assembly in accordance with claim 1, wherein:
    the RFID tag further comprises a ground plane; and
    the RFID tag is disposed on the door such that the antenna is disposed on the outer face of the door and the ground plane is disposed on the inner face.

3. The RFID tag assembly in accordance with claim 1, further comprising:
    a ground plane disposed on the enclosure in opposing alignment to the door in the closed position;
    a ground plane electrical contact point coupled to the ground plane; and
    an antenna electrical contact point coupled to the antenna;
    wherein when the door is in the closed position, a direct electrical contact is formed between the antenna and ground plane electrical contact points.

4. The RFID tag assembly in accordance with claim 1, further comprising:
    a ground plane disposed on the enclosure in opposing alignment to the door in the closed position wherein when the door is in the closed position, an inductive electrical connection is formed between the antenna and the ground plane.

5. The RFID tag assembly in accordance with claim 1, further comprising:
   a ground plane disposed on the enclosure in opposing alignment to the door in the closed position;
   a ground plane electrical contact point coupled to the ground plane; and
   an antenna electrical contact point coupled to the antenna;
   wherein when the door is in the closed position, an inductive electrical connection is formed between the antenna and ground plane electrical contact points.

6. The RFID tag assembly in accordance with claim 1, wherein the hinge further comprises a bump and detent arrangement such that when the door is moved to the position that exposes the inner face and the outer face or items attached thereto for viewing, the bump engages the detent so as to reversibly hold the door in the engagement position.

7. The RFID tag assembly in accordance with claim 1, wherein the hinge comprises an at least translucent material such that symbols on or attached to the enclosure surface covered by the hinge are legible through the at least translucent material.

8. The RFID tag assembly in accordance with claim 1, wherein:
   the RFID tag further comprises an inner surface and an outer surface;
   the RFID tag is disposed on one or both of the inner face and outer face of the door such that the inner surface of the tag is adjacent to the door; and
   the RFID tag outer surface, the faces of the door not having the RFID tag disposed thereon, and the enclosure surface adjacent to the inner face of the door when in the closed position have text and graphics printed thereon.

* * * * *